US012791668B2

(12) United States Patent
Jeong et al.

(10) Patent No.: US 12,791,668 B2
(45) Date of Patent: Nov. 10, 2026

(54) BOARD STRUCTURE FOR TRANSMITTING AND RECEIVING IN LIDAR DEVICE

(71) Applicant: HL KLEMOVE CORP., Incheon (KR)

(72) Inventors: SeongHee Jeong, Gyeonggi-do (KR); YunKi Han, Gyeonggi-do (KR); HoSeok Shin, Gyeonggi-do (KR); HakGu Han, Gyeonggi-do (KR); Chulseung Lee, Gyeonggi-do (KR); YongMin Park, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 1350 days.

(21) Appl. No.: 17/346,081

(22) Filed: Jun. 11, 2021

(65) Prior Publication Data

US 2021/0389425 A1 Dec. 16, 2021

(30) Foreign Application Priority Data

Jun. 12, 2020 (KR) ........................ 10-2020-0071381

(51) Int. Cl.
*G01S 7/481* (2006.01)
*G02B 7/02* (2021.01)

(52) U.S. Cl.
CPC .............. *G01S 7/4813* (2013.01); *G02B 7/02* (2013.01)

(58) Field of Classification Search
CPC ......... G01S 7/4813; G02B 7/023; G02B 7/02; F16B 5/0225; H01S 5/02365; F16L 3/20; F16L 23/00
See application file for complete search history.

(56) References Cited

U.S. PATENT DOCUMENTS 1,346,325 A * 7/1920 Mckinley .............. F16B 5/0225 180/69.2
1,872,385 A * 8/1932 Andren ................. F16B 5/0225 192/36

(Continued)

FOREIGN PATENT DOCUMENTS

KR 20190089508 A * 7/2019 ............. G01S 7/484
KR 102094767 B1 * 3/2020 ............... G08G 1/04

OTHER PUBLICATIONS

Horner, Joseph Gregory. The Principles of Fitting: For Engineers, Apprentices, and Students in Technical Schools. Sir Isaac Pitman and Sons, Limited, 1919. (Year: 1919).*

(Continued)

*Primary Examiner* — Yuqing Xiao
(74) *Attorney, Agent, or Firm* — WOMBLE BOND DICKINSON (US) LLP

(57) ABSTRACT

The board structure for transmitting and receiving in a lidar device according to the present disclosure is installed in the lidar device, and includes a lens barrel having a lens mounted on a first inner circumferential surface so as to be movable, and having at least one first connection part provided on a first outer circumferential surface; a guide barrel having at least one second connection part connected to the first connection part on a second outer circumferential surface, and having a first fixing hole formed to penetrate from the second outer circumferential surface to a second inner circumferential surface; a transmission/reception board having a diode mounted on a part of an upper surface and at least partially inserted into an inner space of the guide barrel; and a first support member that penetrates through the first fixing hole and supports an upper surface or lower surface of the transmission/reception board.

16 Claims, 10 Drawing Sheets

(56) References Cited

U.S. PATENT DOCUMENTS

| | | | | |
|---|---|---|---|---|
| 8,568,055 | B2 * | 10/2013 | Marques Lito Velez Grilo .......... | E02D 27/42 403/4 |
| 9,880,263 | B2 * | 1/2018 | Droz ..................... | G01S 7/4817 |
| 2007/0053402 | A1 * | 3/2007 | Braunecker ........... | G01S 7/4813 372/92 |
| 2014/0160566 | A1 * | 6/2014 | Shihoh ................. | G02B 27/646 359/557 |
| 2023/0008790 | A1 * | 1/2023 | Zhang ................... | G01S 7/4865 |

OTHER PUBLICATIONS

Adjustable SM1 Lens Tubes. Thorlabs. Retrieved from the internet: <https://www.thorlabs.com/newgrouppage9.cfm?objectgroup_id=4109>. (Year: 2015).*

Screen capture from YouTube video clip entitled "Thorlabs Lens Tube Zoom Housing", uploaded on May 21, 2014 by user "Thorlabs". Retrieved from Internet: <https://www.youtube.com/watch?v=Vsn0em5d-P8> (Year: 2014).*

General Adhesives. Thorlabs. Retrieved from the internet: <https://www.thorlabs.com/newgrouppage9.cfm?objectgroup_id=1452>. (Year: 2011).*

Setscrews and Thumbscrews. Thorlabs. Retrieved from the internet: <https://www.thorlabs.com/newgrouppage9.cfm?objectgroup_id=1437>. (Year: 2016).*

Nylon PA6 material properties. Retrieved from the internet: <https://www.broncesval.com/en/plasticos-tecnicos/nylon-pa6-polyamide-6/>. (Year: 2025).*

* cited by examiner (a) (b)

BOARD STRUCTURE FOR TRANSMITTING AND RECEIVING IN LIDAR DEVICE

CROSS-REFERENCE TO RELATED APPLICATION

This application claims priority to and the benefit of Korean Patent Application No. 10-2020-0071381, filed on Jun. 12, 2020, the disclosure of which is incorporated herein by reference in its entirety.

TECHNICAL FIELD

The present disclosure relates to a board structure for transmitting and receiving in a lidar device, and more specifically, the present disclosure relates to a board structure for transmitting and receiving in a lidar device, which is installed to transmit and receive optical signals in the lidar device.

BACKGROUND ART

Looking at the transmission/reception board of a LiDAR device installed for autonomous driving, the TO CAN-type laser diodes are mostly applied.

Referring to FIG. 1, after a separate frame protruding in the upper surface direction of a transmission/reception board 50 is installed characteristically in consideration of the emission and reception directions of optical signals, it can be seen that the transmission/reception board, on which such TO CAN-type laser diodes are mounted, has a lens 17 which is fixed thereby.

Meanwhile, in a lidar device, it is necessary to apply a surface mount device (SMD) diode in order to improve the rising time and increase the power of emitted optical signals. However, in the case of a surface-mount diode, there is a problem in that the structure of the transmission/reception board, which is applied to the TO CAN-type laser diode, cannot be applied due to structural characteristics.

Specifically, since the surface-mount diode receives an optical signal from a lens arranged in the side direction of the transmission/reception board or outputs an optical signal through a lens arranged in the side direction, the conventional method of installing a separate frame on the upper surface of the board is no longer suitable.

Therefore, in order to apply the surface-mount diode, it is necessary to develop a board structure for transmitting and receiving in a lidar device, in which a transmission/reception board equipped with a surface-mount diode can be easily installed in consideration of the relationship with the lens arranged on the side direction of the board.

DISCLOSURE

Technical Problem

An exemplary embodiment of the present disclosure is to provide a board structure for transmitting and receiving in a lidar device, in which a surface-mount diode can be easily mounted.

An exemplary embodiment of the present disclosure is to provide a board structure for transmitting and receiving in a lidar device, which facilitates alignment between a transmission/reception board and a lens barrel on which a lens is mounted.

Technical Solution

According to an aspect of the present disclosure, as a board structure for transmitting and receiving in a lidar device which is installed to transmit or receive optical signals in the lidar device, the board structure for transmitting and receiving in a lidar device is provided, including a lens barrel having a lens mounted on a first inner circumferential surface so as to be movable, and having at least one first connection part provided on a first outer circumferential surface; a guide barrel having at least one second connection part connected to the first connection part on a second outer circumferential surface, and having a first fixing hole formed to penetrate from the second outer circumferential surface to a second inner circumferential surface; a transmission/reception board having a diode mounted on a part of an upper surface and at least partially inserted into an inner space of the guide barrel; and a first support member that penetrates through the first fixing hole and supports an upper surface or lower surface of the transmission/reception board.

In this case, the lens may be mounted on the lens barrel by a lens housing.

In this case, the first inner circumferential surface may be provided with a screw crest and a screw root in part, and the lens housing may be provided with a screw crest and a screw root corresponding to the screw crest and the screw root of the first inner circumferential surface in part.

In this case, a slit may be formed on a part of the first outer circumferential surface along the moving direction of the lens, and the lens housing may have a holder protruding through the slit from an outer circumferential surface of the lens housing.

In this case, the lens barrel and the guide barrel may be formed in a cylindrical shape.

In this case, the transmission/reception board may be formed in a flat planar shape, and the guide barrel may have a rectangular-shaped inner space formed therein to correspond to the shape of the transmission/reception board.

In this case, the first connection part and the second connection part may have a first through hole and a second through hole, respectively.

In this case, the first connection part and the second connection part may be connected to each other by a first bolt passing through the first through hole and the second through hole, and a first nut coupled with the first bolt.

In this case, any one of the first through hole and the second through hole may be formed as a long hole in which the first bolt is movable in a direction perpendicular to the moving direction of the lens.

In this case, a plurality of the first connection parts and a plurality of the second connection parts may be provided, respectively, and at least one of the plurality of the first connection parts or the plurality of the second connection parts may have a long hole formed in a direction in which the x-axis direction alignment of the lens barrel and the guide barrel is possible, and at least the other one may have a long hole formed in a direction in which the y-axis direction alignment of the lens barrel and the guide barrel is possible.

In this case, among the plurality of the second connection parts, the second connection part having a long hole for the x-axis direction alignment, and the second connection part having a long hole for the y-axis direction alignment may be respectively disposed in the upper direction and the lower direction of the diode, and may be disposed to face each other.

In this case, among the plurality of the second connection parts, the second connection part having a long hole for the x-axis direction alignment, and the second connection part having a long hole for the y-axis direction alignment may be respectively disposed in both side directions of the diode, and may be disposed to face each other.

In this case, the board structure may further include a second fixing hole facing the first fixing hole and a second supporting member for supporting one surface of the transmission/reception board through the second fixing hole, and the transmission/reception board may be inserted between the first fixing hole and the second fixing hole and supported by the first support member and the second support member.

In this case, the first support member or the second support member may be a second bolt.

In this case, the first support member or the second support member may be formed by curing an adhesive.

In this case, the board structure may further include a damper between one surface of the transmission/reception board and the first support member or between the other surface of the transmission/reception board and the second support member.

In this case, the damper may be formed of a material having elasticity.

In this case, the diode may be a surface-mount diode.

According to another aspect of the present invention, provided is a lidar scanning device, including a light output means for emitting a pulse laser; a light reflecting means for reflecting the pulse laser, and a light receiving means for receiving the pulse laser reflected through the light reflecting means, wherein at least one of the light output means and the light receiving means includes the aforementioned board structure.

According to another aspect of the present invention, provided is a vehicle on which the aforementioned lidar scanning device is mounted.

Advantageous Effects

The board structure for transmitting and receiving in a lidar device according to an exemplary embodiment of the present disclosure can be connected to a lens barrel on which a lens is mounted, and a surface-mount diode can be applied in the lidar device by introducing a guide barrel on which the transmission/reception board is mounted in the inner space.

In the board structure for transmitting and receiving in a lidar device according to an exemplary embodiment of the present disclosure, alignment between the optical axis of the lens and the transmission/reception board is possible through the first connection part and the second connection part.

The board structure for transmitting and receiving in a lidar device according to an exemplary embodiment of the present disclosure has a first fixing hole formed in a guide barrel and a first support member penetrating therethrough, thereby effectively supporting the transmission/reception board and securing a high level of alignment margin.

MODES OF THE INVENTION

Figure 1:
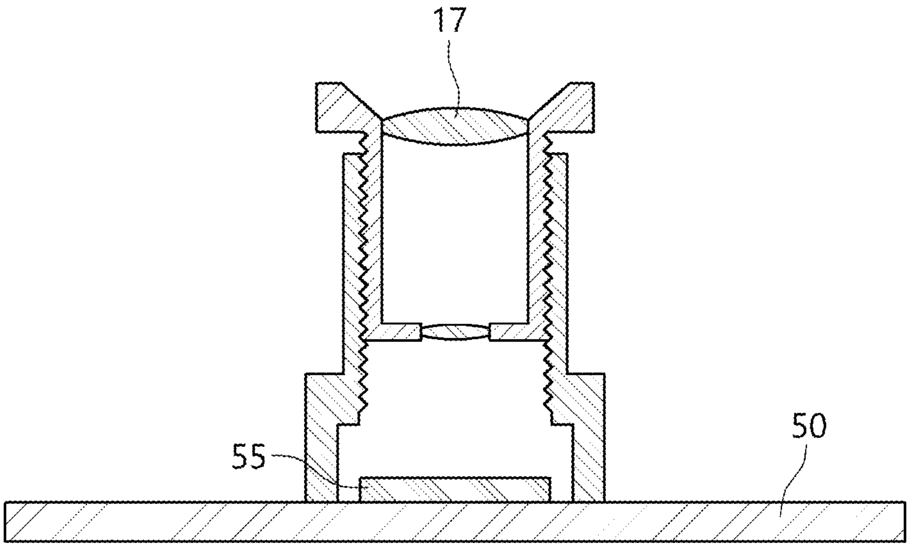
FIG. 1 is a diagram showing a transmission/reception board structure equipped with a TO CAN-type laser diode.

Hereinafter, exemplary embodiments of the present disclosure will be described in detail with reference to the accompanying drawings such that those of ordinary skill in the art to which the present disclosure pertains may easily practice the present disclosure. The present disclosure may be implemented in various different forms and is not limited to the exemplary embodiments described herein. In the drawings, parts irrelevant to the description are omitted in order to clearly describe the present disclosure, and the same reference numerals are assigned to the same or similar components throughout the specification.

In the present specification, terms such as “include” or “have” are intended to designate the presence of features, numbers, steps, actions, components, parts or combinations thereof described in the specification, and it is to be understood that it does not preclude the possibility of the presence or addition of one or more other features, numbers, steps, actions, components, parts or combinations thereof.

In the present specification, the “moving direction of a lens” referred to in relation to the direction should be understood to mean a direction in which the lens may move forward or backward along the extension direction of a lens barrel in a column shape.

Figure 2:
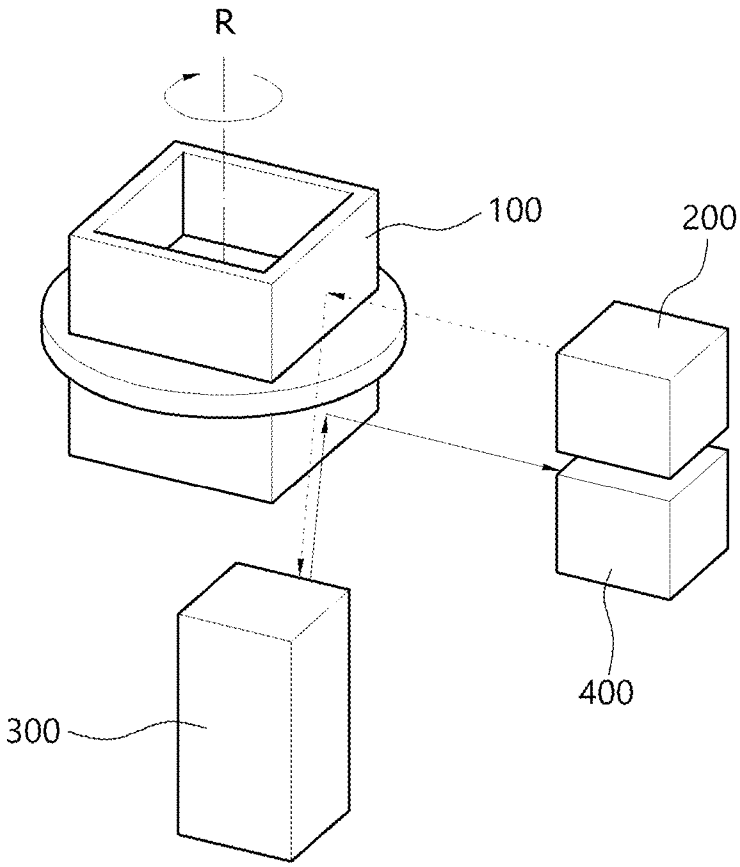
FIG. 2 is a diagram illustrating a lidar device provided with a light output means and a light receiving means.

FIG. 2 is a diagram illustrating a lidar device provided with a light output means and a light receiving means.

The board structure 1 for transmitting and receiving in a lidar device according to an exemplary embodiment of the present disclosure may be a structure applied to a light output means or a light receiving means installed to transmit or receive an optical signal in a lidar device.

More specifically, referring to FIG. 2, in a light detection and ranging (LIDAR) scanning device that collects spatial information by sensing a pulsed laser reflected from an object 300 after emitting a pulsed laser, the board structure for transmitting and receiving in a lidar device according to an exemplary embodiment of the present disclosure may be a structure applied to a light output means 200 for emitting a pulsed laser through a light reflecting means 100 or a light receiving means 400 for sensing the reflected pulsed laser.

In this case, the lidar scanning device is an illustrated example, and may be mounted on one side of a vehicle to collect spatial information about a space adjacent to the vehicle. The spatial information collected in this way may be used for autonomous driving of a vehicle and the like, and for example, it may be a separation distance from another vehicle located in the front, rear or side of the vehicle, the speed of the other vehicle and the like.

Figure 3:
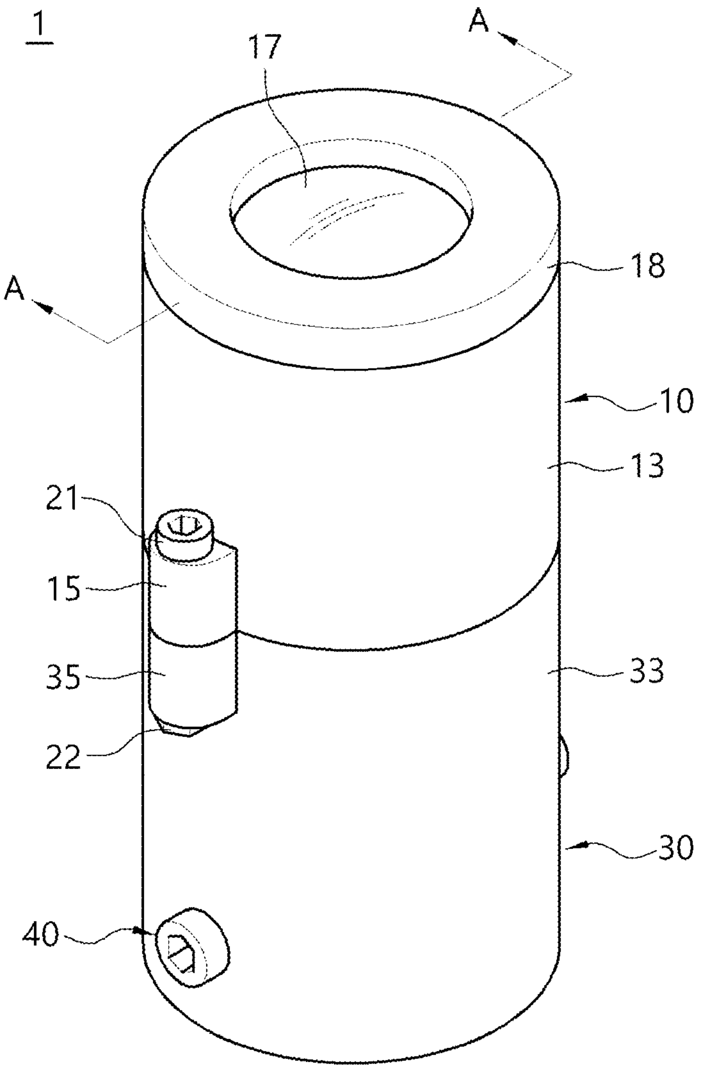
FIG. 3 is a diagram illustrating the board structure for transmitting and receiving in a lidar device according to an exemplary embodiment of the present disclosure.
Figure 4:
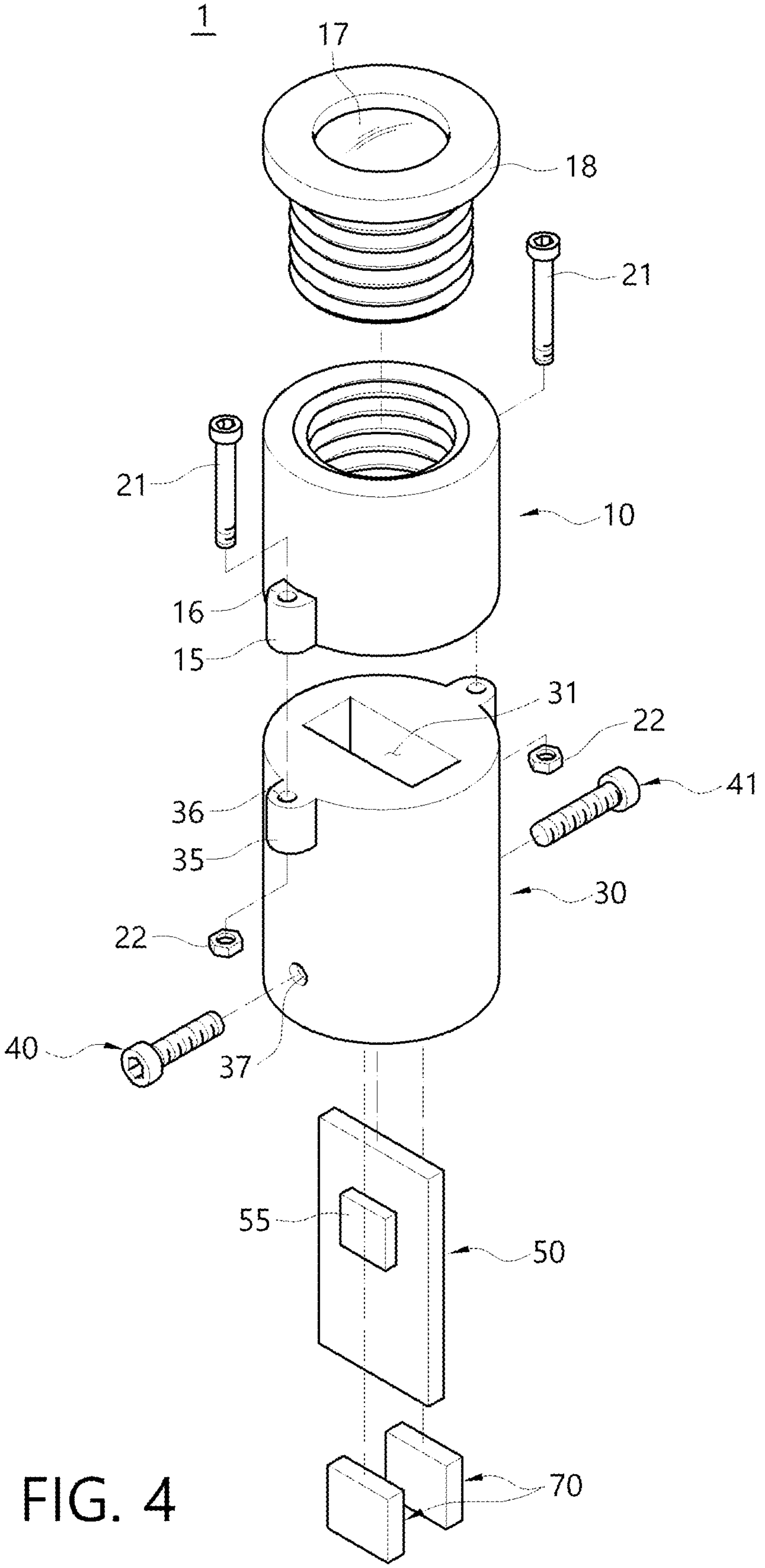
FIG. 4 is a diagram illustrating an exploded view of the board structure for transmitting and receiving in a lidar device according to an exemplary embodiment of the present disclosure.
Figure 5:
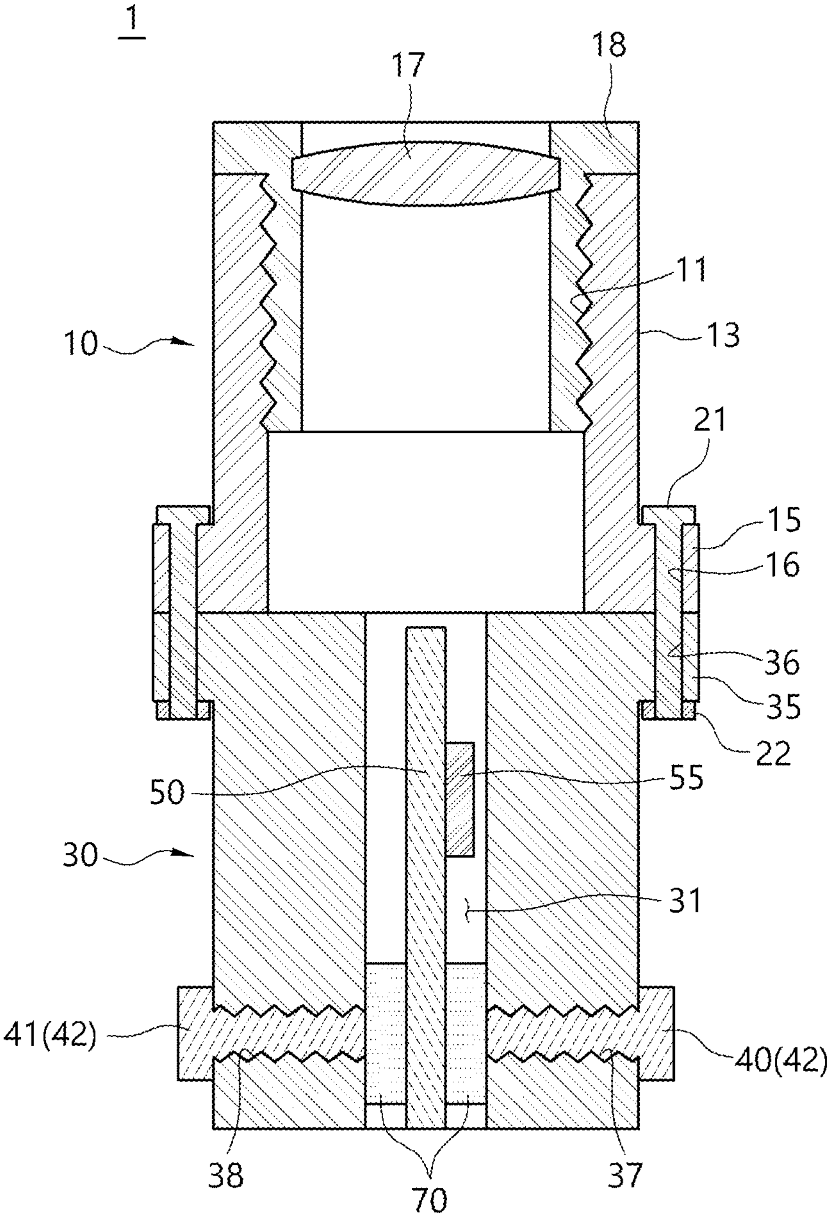
FIG. 5 is a diagram illustrating the board structure for transmitting and receiving in a lidar device illustrated in FIG. 3 by cutting in the A-A direction.
Figure 6:
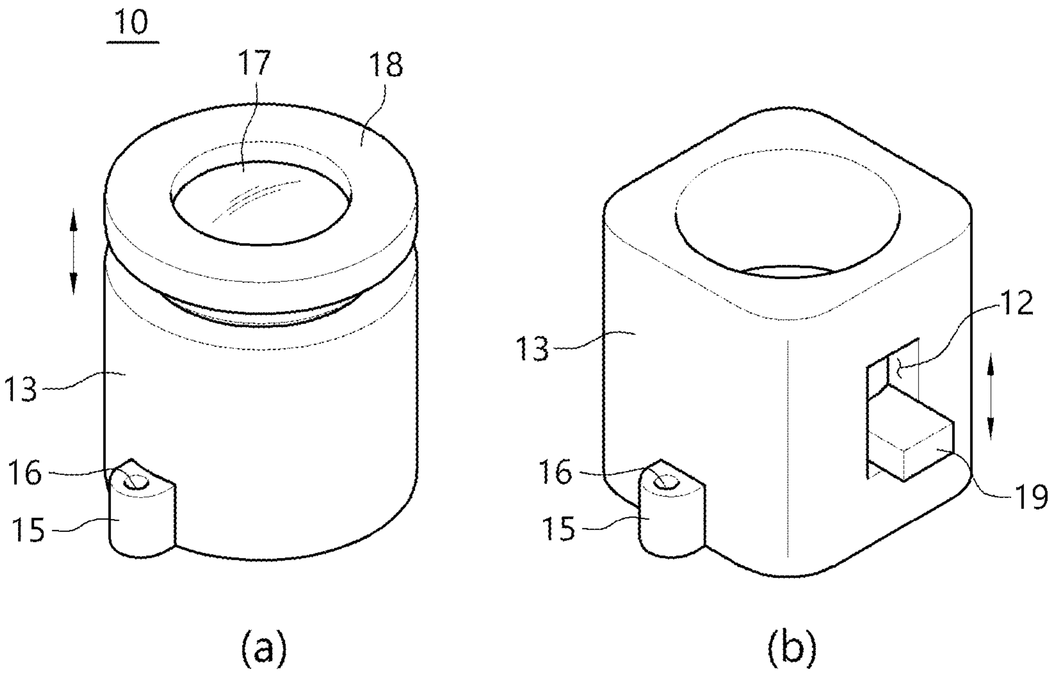
FIGS. 6 and 7 are diagrams illustrating and describing the movement of a lens in a lens barrel of the board structure for transmitting and receiving in a lidar device according to an exemplary embodiment of the present disclosure.
Figure 7:
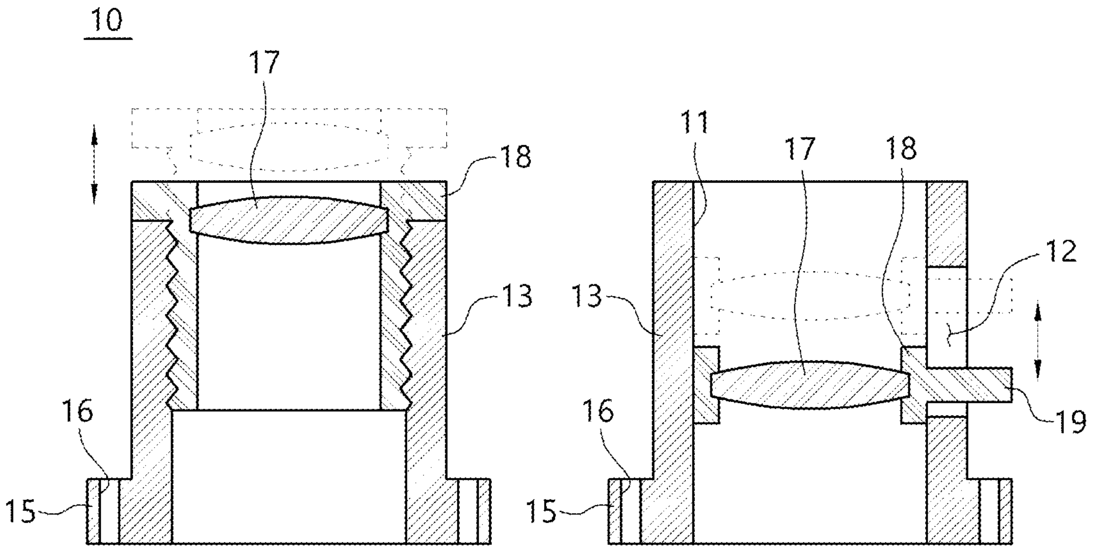

FIG. 3 is a diagram illustrating the board structure for transmitting and receiving in a lidar device according to an exemplary embodiment of the present disclosure. FIG. 4 is a diagram illustrating an exploded view of the board structure for transmitting and receiving in a lidar device according to an exemplary embodiment of the present disclosure. FIG. 5 is a diagram illustrating the board structure for transmitting and receiving in a lidar device illustrated in FIG. 3 by cutting in the A-A direction. FIGS. 6 and 7 are diagrams illustrating and describing the movement of a lens in a lens barrel of the board structure for transmitting and receiving in a lidar device according to an exemplary embodiment of the present disclosure.

The board structure 1 for transmitting and receiving in a lidar device according to an exemplary embodiment of the present disclosure includes a lens barrel 10, a guide barrel 30, a transmission/reception board 50 and a first support member 40.

Referring to FIGS. 6 and 7, in an exemplary embodiment of the present disclosure, the lens barrel 10 may be formed in a column shape. For example, the lens barrel 10 may be formed in the shape of a cylinder or a square column with rounded corners as illustrated in FIG. 6, but the shape of the lens barrel 10 is not limited.

In this case, the lens barrel 10 may include one surface parallel to the lens 17 and another surface facing the same. In addition, the lens barrel 10 may include a first outer circumferential surface 13 surrounding the lens barrel 10 along the circumference of two surfaces facing as above.

Meanwhile, the lens barrel 10 may have a space formed in which the inside is penetrated from one surface parallel to the lens 17 to the other surface facing the same such that the lens 17 is movable inside the lens barrel 10. In this regard, the lens barrel 10 may include a first inner circumferential surface 11 forming an inner space of the lens barrel 10.

In this case, a part of the first inner circumferential surface 11 of the lens barrel 10 may have a screw crest and a screw root formed along the moving direction of the lens 17. This is to cause the lens 17 to move along the screw root, when a circular lens 17 or a lens housing 18 to be described below is rotated as illustrated in FIG. 6.

In an exemplary embodiment of the present disclosure, the lens 17 may be mounted on the lens barrel 10 by the lens housing 18. That is, the lens 17 is not mounted in direct contact with the lens barrel 10, but the lens housing 18 is present between the lens 17 and the lens barrel 10 such that the lens 17 may move together as the lens housing 18 moves.

In this case, a part of the lens housing 18 corresponds to the screw crest and the screw root of the first inner circumferential surface 11 described above, and a screw crest and a screw root may be formed. This is to allow the lens housing 18 to move along the first inner circumferential surface 11 of the lens barrel 10 while rotating.

Meanwhile, referring to FIGS. 6 and 7, when the lens 17 moves, it may be moved through a holder 19 of the lens housing 18 in addition to the method of rotating the lens 17 or the lens housing 18.

Specifically, a slit 12 is formed on a part of the first outer circumferential surface 13 of the lens barrel 10 along the moving direction of the lens 17, and a holder 19 protruding in a direction of the first outer circumferential surface 13 of the lens barrel 10 may be formed on a part of the lens housing 18.

In this case, the holder 19 may protrude by passing through the slit 12, and an operator or an operational robot may move the lens 17 to a desired position by grasping the holder 19 and moving along the slit 12.

In an exemplary embodiment of the present disclosure, at least one first connection part 15 may be provided on the first outer circumferential surface 13 of the lens barrel 10.

The first connection part 15 of the lens barrel 10 is a configuration corresponding to the second connection part 35 of the guide barrel 30 to be described below, and it is a configuration for connecting the lens barrel 10 and the guide barrel 30 to each other. Accordingly, it is preferable that the first connection part 15 is formed in a region adjacent to the guide barrel 30 among the first outer circumferential surface 13.

The first connection part 15 may be formed in a column shape extending in the same direction as the lens barrel 10 and may be connected to a second connection part 35 to be described below. Herein, being connected to each other may mean that the first connection part 15 and the second connection part 35 are coupled to each other, or are connected to each other or form a relationship using different members.

For example, in an exemplary embodiment of the present disclosure, the first connection part 15 may have a first through hole 16 formed to penetrate in the same direction as the inner space of the lens barrel 10. This is to provide a space for fastening a first bolt 21 and a first nut 22 when the first connection part 15 and the second connection part 35 are connected.

In contrast, the first connection part 15 may have a groove (not illustrated) to be coupled with a protrusion (not illustrated) protruding from the second connection part 35 instead of a through hole, or conversely, it may have a protrusion (not illustrated) to be coupled to a groove (not illustrated) provided in the second connection part 35. That is, the first connection part 15 or the second connection part 35 may be formed and connected in a structure that is coupled by adopting any one of a female fastening member or a male fastening member, respectively.

However, it should be noted that the type of the first connection part 15 is not limited to the above-described example, and may be formed in various shapes according to the connection structure with the second connection part 35. The connection between the first connection part 15 and the second connection part 35 will be described in detail after the description of the second connection part 35 is finished.

Figure 8:
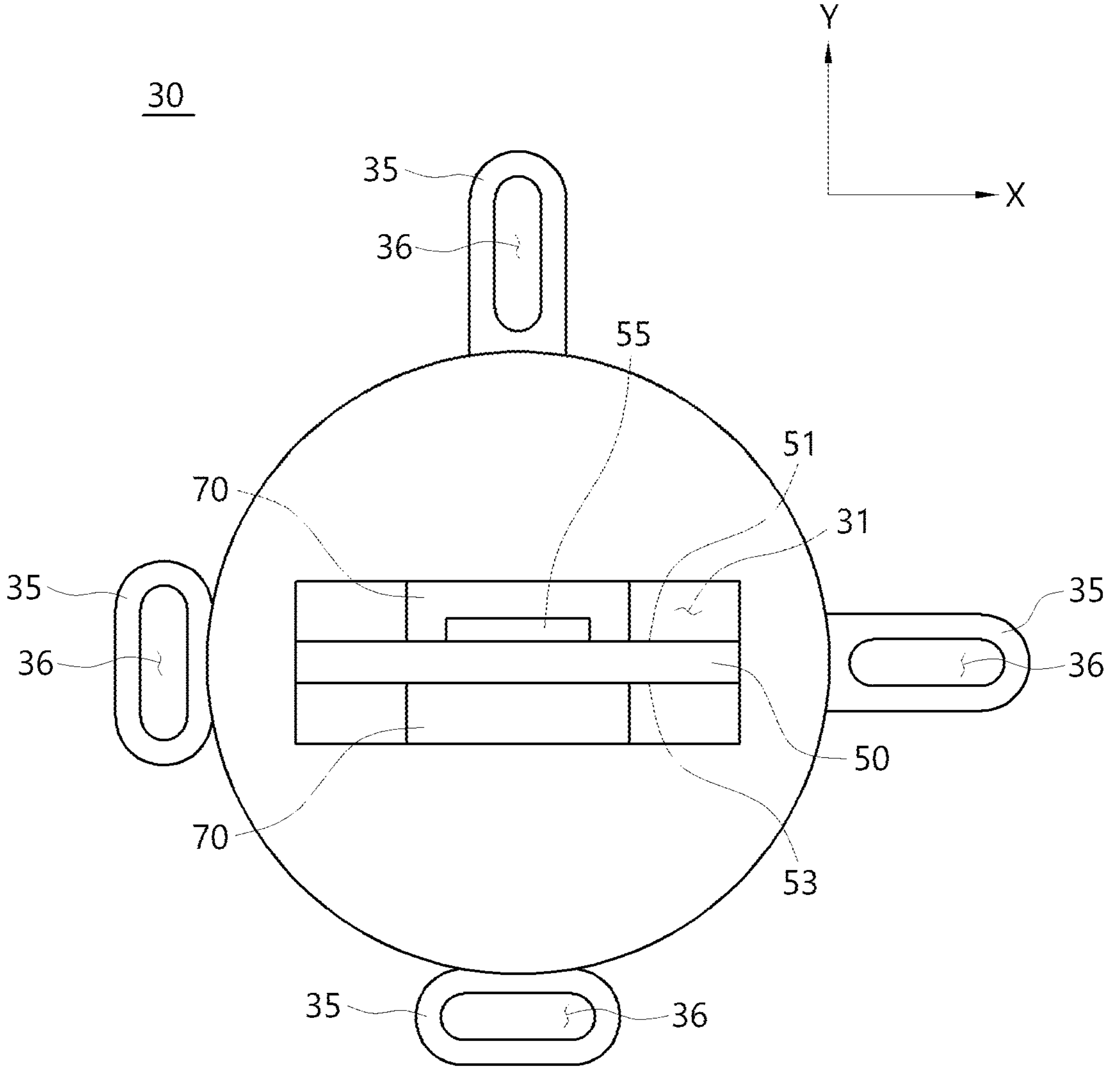
FIG. 8 is a diagram of a guide barrel of the board structure for transmitting and receiving in a lidar device according to an exemplary embodiment of the present disclosure as viewed from a direction connected to the lens barrel.

FIG. 8 is a diagram of a guide barrel of the board structure for transmitting and receiving in a lidar device according to an exemplary embodiment of the present disclosure as viewed from a direction connected to the lens barrel.

The board structure 1 for transmitting and receiving in a lidar device according to an exemplary embodiment of the present disclosure may include a guide barrel 30 to which the transmission/reception board 50 is fixed therein and connected to the lens barrel 10.

The guide barrel 30 may be formed in a column shape like the lens barrel 10. For example, the guide barrel 30 may be formed in the shape of a cylinder or a square column with rounded corners, but is preferably formed in a column shape corresponding to the lens barrel 10.

Specifically, the guide barrel 30 may include one surface and the other surface facing the same. In addition, the guide barrel 30 may include a second outer circumferential surface 33 surrounding the guide barrel 30 along the circumference of the two surfaces described above.

In an exemplary embodiment of the present disclosure, an inner space 31 in which a transmission/reception board 50 to be described below may be inserted and positioned inside the guide barrel 30 may be formed. Herein, the inner space

31 may be formed by penetrating through the guide barrel 30 along the insertion direction of the transmission/reception board 50.

Through this, the optical signal passing through the lens 17 of the lens barrel 10 is transmitted to a diode 55 of the transmission/reception board 50 which is present in the inner space 31 of the guide barrel 30, or the optical signal emitted through the diode 55 of the transmission/reception board 50 may proceed to the outside of the lens barrel 10 via the lens 17.

In this case, the cross section of the guide barrel 30 cut in a direction perpendicular to the moving direction of the lens 17 may include a rectangular inner space 31 so as to correspond to the shape of the transmission/reception board 50 as illustrated in FIG. 8. However, the shape of the cut surface of the inner space 31 is not limited thereto, and any shape may be formed as long as it is a structure suitable for the insertion of the transmission/reception board 50.

In an exemplary embodiment of the present disclosure, the guide barrel 30 may include a first fixing hole 37 for fixing the transmission/reception board 50.

In this case, the first fixing hole 37 may mean a hole penetrating from the second outer circumferential surface 33 of the guide barrel 30 to the inner space 31.

As an example, the first fixing hole 37 may be formed by penetrating through the guide barrel 30 from the second outer circumferential surface 33 of the guide barrel 30 to the inner space 31 in a direction perpendicular to the moving direction of the lens 17 as illustrated in the drawings.

In an exemplary embodiment of the present disclosure, the first support member 40 may be inserted into the first fixing hole 37. This is to fix the transmission/reception board 50 to the guide barrel 30 by supporting the transmission/reception board 50 to be described below through the first support member 40.

As an example, as illustrated in FIG. 5, the first support member 40 may be a second bolt 42. In this case, a screw crest and a screw root may be formed in a part of the first fixing hole 37 to achieve a stable fastening with the second bolt 42.

In this case, the second bolt 42 enters one end of the first fixing hole 37 connected to the second outer circumferential surface 33, and finally, pressure may be applied to one surface of the transmitting/receiving board 50 present inside the inner space 31 in contact with the other end of the first fixing hole 37.

As another example, the first support member 40 may be a cured adhesive. Specifically, after injecting an adhesive into the entrance of the first fixing hole 37 formed on the second outer circumferential surface, and after a certain period of time, the adhesive is cured such that the first fixing hole 37 may be filled. Herein, the cured adhesive (not illustrated) may stably support the transmission/reception board 50 because hardness and rigidity are secured unlike before curing.

In an exemplary embodiment of the present disclosure, referring to FIGS. 4 and 5, a damper 70 may be present between the first support member 40 and the transmission/reception board 50. That is, the first support member 40 may not directly contact and support the transmission/reception board 50, but may indirectly support the transmission/reception board 50 through the damper 70 in contact with the transmission/reception board 50.

In this case, it is preferable that the damper 70 is formed of a material having an elastic force. Therefore, when pressure by the first support member 40 is applied to the damper 70 having an elastic force, the above-described damper 70 may be compressively deformed along the direction in which the pressure is applied.

Through this, it is possible to prevent damage or harm to the transmission/reception board 50 that may occur when the transmission/reception board 50 and the first support member 40 contact each other. In addition, by disposing the damper 70 having elasticity to minimize an air gap between the damper 70 and the transmission/reception board 50, the support force through the first support member 40 may be more effectively transmitted.

Meanwhile, in an exemplary embodiment of the present disclosure, the guide barrel 30 may further include a second fixing hole 38.

Referring again to FIGS. 4 and 5, based on the inner space 31 of the guide barrel 30, a second fixing hole 38 may be formed opposite to the first through hole 16. Herein, the second fixing hole 38 may be formed by penetrating through the guide barrel 30 from the second outer circumferential surface 33 to the inner space 31 like the first fixing hole 37.

The shape and function of the second fixing hole 38 are the same as those of the first fixing hole 37 described above. However, a second support member 41 having the same shape and function as the first support member 40 penetrates through the second fixing hole 38. In addition, as illustrated in FIG. 5, the second fixing hole 38 supports one surface opposite to one surface of the transmission/reception board 50 supported by the first fixing hole 37.

In this case, the transmission/reception board 50 is finally inserted between the first fixing hole 37 and the second fixing hole 38, and the upper surface 51 and the lower surface 53 are supported by the first support member 40 and the second support member 41. Herein, the upper surface 51 is parallel to the ground among the two surfaces 51 and 53 of the transmission/reception board 50, but it may mean the surface on which the diode 55 is mounted, and the lower surface 53 may mean the surface that is present in a direction opposite to the upper surface 51.

Accordingly, the transmission/reception board 50 may be more rigidly fixed to the guide barrel 30. In addition, since both surfaces 51 and 53 of the transmission/reception board 50 and the first support member 40 and the second support member 41 contact each other, a larger alignment margin may be secured when the transmission/reception board 50 and the guide barrel 30 are fixed, compared to when only the first fixing hole 37 is present.

Meanwhile, a plurality of first fixing holes 37 and a plurality of second fixing holes 38 may be formed in the guide barrel 30 to enhance a supporting force. Certainly, a plurality of first support members 40 and a plurality of second support members 41 corresponding thereto may also be present.

The board structure 1 for transmitting and receiving in a lidar device according to an exemplary embodiment of the present disclosure includes a transmission/reception board 50 supported by a guide barrel 30.

The transmission/reception board 50 may be a conventional printed circuit board (PCB) in which electronic components such as resistors, capacitors, integrated circuits and the like are fixed and gaps between the components are connected by wires to form an electronic circuit.

In this case, surface-mount diodes (SMDs) may be mounted on a part of the transmission/reception board 50. Through this, the lidar device, to which the board structure for transmitting and receiving in a lidar device according to an exemplary embodiment of the present disclosure is applied, may improve a rising time and increase power of an emitted optical signal.

Referring to FIG. 4, as described above, part or all of the transmission/reception board 50 is inserted into the inner space 31 of the guide barrel 30 in the same direction as the extension direction of the inner space 31 such that it is fixed to the guide barrel 30 by the first support member 40 or the second support member 41.

Afterwards, the board structure 1 for transmitting and receiving in a lidar device according to an exemplary embodiment of the present disclosure emits an optical signal toward the lens 17 through the side of the diode 55 or receives an optical signal from the lens 17.

Hereinafter, the connection between the first connection part 15 and the second connection part 35 will be described in more detail.

Figure 9:
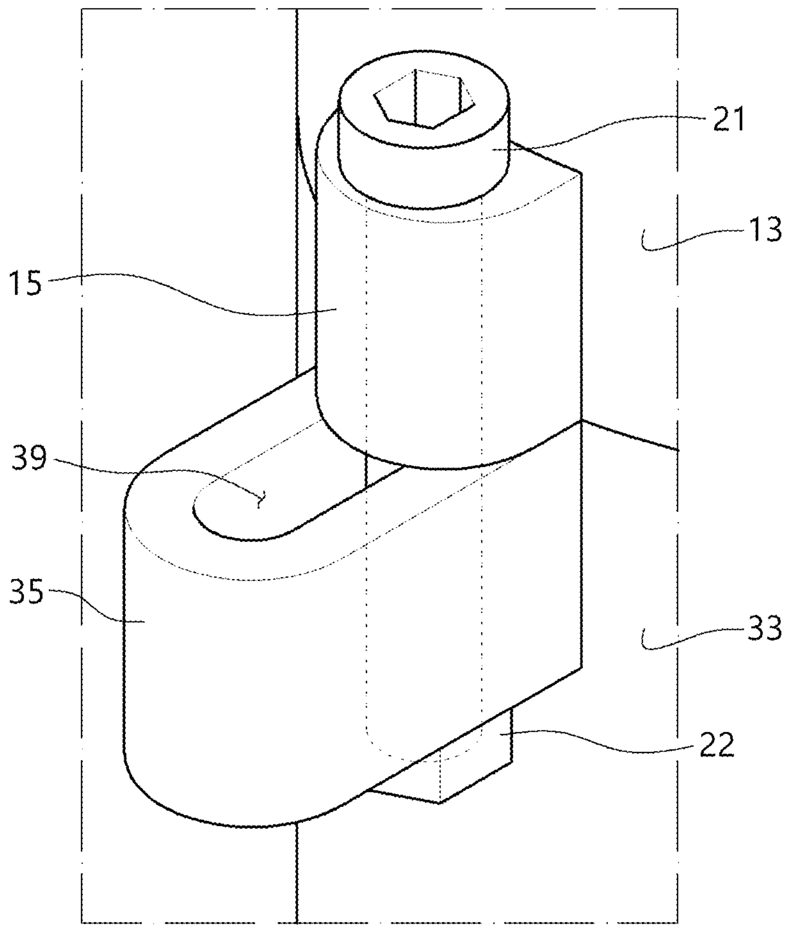
FIGS. 9 and 10 are enlarged diagrams illustrating the connection between the first connection part and the second connection part of the board structure for transmitting and receiving in a lidar device according to an exemplary embodiment of the present disclosure.
Figure 10:
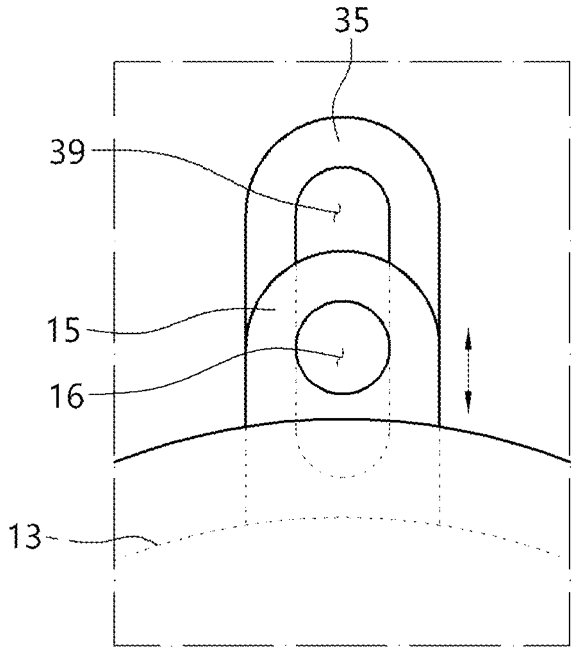

FIGS. 9 and 10 are enlarged diagrams illustrating the connections between the first connection part and the second connection part of the board structure for transmitting and receiving in a lidar device according to an exemplary embodiment of the present disclosure.

In an exemplary embodiment of the present disclosure, the first connection part 15 and the second connection part 35 may have a first through hole 16 and a second through hole 36, respectively. Herein, the first through hole 16 and the second through hole 36 may be formed in a direction parallel to the moving direction of the lens 17.

The first connection part 15 and the second connection part 35 may be connected to each other by a coupling between a first bolt 21 passing through the first through hole 16 and the second through hole 36, and a first nut 22 coupled to the first bolt 21.

In this case, referring to FIG. 9, any one of the first through hole 16 and the second through hole 36 may be formed as a long hole 39. Herein, the long hole 39 may mean a hole formed by extending in any one direction similar to a slit so as to be movable in a direction perpendicular to the direction in which a member is inserted, such as the first bolt 21.

In an exemplary embodiment of the present disclosure, it is preferable that the long hole 39 formed in any one of the first through hole 16 and the second through hole 36 is formed to be movable in any one direction perpendicular to the moving direction of the lens as illustrated.

Referring to FIG. 10, a long hole 39 is formed in any one of the first through hole 16 and the second through hole 36 as described above such that when a lens barrel 10 and a guide barrel 30 are combined, effective alignment is possible in the extension direction of the long hole 39.

In an exemplary embodiment of the present disclosure, a plurality of first through holes 16 and a plurality of second through holes 36 may be provided, respectively. Accordingly, there may be a plurality of long holes 39 formed in any one of the first through hole 16 and the second through hole 36.

In this case, at least one of the first through hole 16 or the second through hole formed as a long hole 39 in the first connection part 15 or the second connection part 35 may be formed in a shape that facilitates the x-axis direction alignment of the lens barrel 10 and the guide barrel 30. In addition, at least one of the first through hole 16 or the second through hole may be formed in a shape that facilitates the y-axis direction alignment of the lens barrel 10 and the guide barrel 30. That is, since the long hole 39 extends in the x-axis direction or the y-axis direction, a fastening member such as the first bolt 21 may be movable in the x-axis or y-axis direction.

Herein, both the x-axis direction and the y-axis direction may be directions perpendicular to the moving direction of the lens 17, and the x-axis direction and the y-axis direction may also be perpendicular to each other. For example, if the x-axis direction is a direction perpendicular to the ground, the y-axis direction may be parallel to the ground, but may be a direction perpendicular to the moving direction of the lens 17.

By having a long hole 39 extending in the x-axis and y-axis directions as described above, the board structure 1 for transmitting and receiving in a lidar device according to an exemplary embodiment of the present disclosure facilitates alignment on an xy plane perpendicular to the moving direction of the lens 17, when the lens barrel 10 and the guide barrel 30 are combined.

Next, alignment between components during the process of forming the board structure 1 for transmitting and receiving in a lidar device according to an exemplary embodiment of the present disclosure will be described.

Herein, the alignment may mean correcting such that an optical axis error does not occur with respect to one reference optical axis by precisely arranging the lens barrel 10, the guide barrel 30 and the transmission/reception board 50. A well-known beam profiler may be used for this alignment operation.

Looking at the alignment process, first, part or all of the transmission/reception board 50 is inserted into the inner space 31 of the guide barrel 30. In this case, the transmission/reception board 50 may be located between the first fixing hole 37 and the second fixing hole 38.

Afterwards, light is emitted towards the transmitting/receiving board 50 using a beam profiler, and an error generated with respect to a reference optical axis preset in the beam profiler is checked. After confirming the same, the operation of moving the transmission/reception board 50 to align so as not to generate an error is repeated. When it is confirmed that no error occurs, in that state, the first support member 40 or the second support member 41 is passed through the first fixing hole 37 and the second fixing hole 38, respectively, to support the transmission/reception board 50. Through this, the transmission/reception board 50 may be fixed to the guide barrel 30 without generating an error with the reference optical axis.

Finally, the first connection part 15 and the second connection part 35 of the lens barrel 10 and the guide barrel 30 are connected to each other. Even during this process, an error generated in the x-axis or y-axis direction is confirmed by emitting light toward the lens 17 of the lens barrel 10 through a beam profiler. In order to eliminate the error, the operation of checking the error is repeated while moving any one of the lens barrel 10 and the guide barrel 10 in the x-axis or y-axis direction. In addition, finally, the alignment of the lens barrel 10, the guide barrel and the transmission/reception board 50 is completed.

As described above, since the board structure 1 for transmitting and receiving in a lidar device according to an exemplary embodiment of the present disclosure has a unique guide barrel 30, it is easy to apply the transmission/reception board 50 equipped with a surface-mount diode.

In addition, despite the application of the transmission/reception board 50 equipped with a surface-mount diode, through the first fixing hole 37 and the second fixing hole 38 or the first connection part 15 and the second connection part 35, alignment between the lens barrel 10, the guide barrel 30 and the transmission/reception board 50 may be precisely performed.

Although an exemplary embodiment of the present disclosure has been described above, the spirit of the present disclosure is not limited to the exemplary embodiment presented in the present specification, and those skilled in the art who understand the spirit of the present disclosure may easily propose other exemplary embodiments by modifying, changing, deleting and adding components within the scope of the same spirit, but it is to be understood that this is also within the scope of the present disclosure.

| [Explanation of Reference Numerals] | |
|---|---|
| 1: Board structure for transmitting and receiving in a lidar device | 12: Slit |
| 10: Lens barrel | 15: First connection part |
| 11: First inner circumferential surface | 17: Lens |
| 13: First outer circumferential surface | 19: Holder |
| 16: First through hole | 22: First nut |
| 18: Lens housing | 31: Inner space |
| 21: First bolt | 37: First fixing hole |
| 30: Guide barrel | 39: Long hole |
| 33: Second outer circumferential surface | 41: Second support member |
| 35: Second connection part | 50: Transmission/reception board |
| 36: Second through hole | 70: Damper |
| 38: Second fixing hole | |
| 40: First support member | |
| 42: Second bolt | |
| 51: Upper surface of transmission/reception board | |
| 52 Lower surface of transmission/reception board | |
| 55: Diode | |

The invention claimed is:

1. A board structure for transmitting and receiving in a lidar device, which is installed to transmit or receive optical signals in the lidar device, the board structure comprising:

a lens barrel having a lens mounted on a first inner circumferential surface so as to be movable, and having a plurality of first connection parts provided on a first outer circumferential surface;

a guide barrel having a plurality of second connection parts each connected to a respective one of the plurality of first connection parts on a second outer circumferential surface, and having a first fixing hole formed to penetrate from the second outer circumferential surface to a second inner circumferential surface;

a transmission/reception board having a diode mounted on an upper surface and at least partially inserted into an inner space of the guide barrel; and a first support member that penetrates through the first fixing hole and supports the upper surface or a lower surface of the transmission/reception board, wherein each of the plurality of first connection parts and each of the plurality of second connection parts have a first through hole and a second through hole, respectively, wherein each of the plurality of first connection parts and the respective one of the plurality of second connection parts are connected to each other by a first bolt passing through the first through hole and the second through hole, and a first nut coupled with the first bolt, wherein any one of the first through hole and the second through hole is formed as a long hole in which the first bolt is movable in a direction perpendicular to the moving direction of the lens, wherein the diode is a surface-mount diode, and wherein at least one of the plurality of second connection parts has a long hole formed in a direction in which the x-axis direction alignment of the lens barrel and the guide barrel is possible, and at least another one of the plurality of second connection parts has a long hole formed in a direction in which the y-axis direction alignment of the lens barrel and the guide barrel is possible.

2. The board structure of claim 1, wherein the lens is mounted on the lens barrel by a lens housing.

3. The board structure of claim 2, wherein the first inner circumferential surface is provided with a screw crest and a screw root in part, and wherein the lens housing is provided with a screw crest and a screw root corresponding to the screw crest and the screw root of the first inner circumferential surface in part.

4. The board structure of claim 2, wherein a slit is formed on a part of the first outer circumferential surface along the moving direction of the lens, and wherein the lens housing has a holder protruding through the slit from an outer circumferential surface of the lens housing.

5. The board structure of claim 1, wherein the lens barrel and the guide barrel are formed in a cylindrical shape.

6. The board structure of claim 1, wherein the transmission/reception board is formed in a flat planar shape, and wherein the guide barrel has a rectangular-shaped inner space formed therein to correspond to the shape of the transmission/reception board.

7. The board structure of claim 1, wherein among the plurality of second connection parts, one of the plurality of second connection parts having a long hole for the x-axis direction alignment, and one of the plurality of second connection parts having a long hole for the y-axis direction alignment are respectively disposed in the upper direction and the lower direction of the diode.

8. The board structure of claim 1, wherein among the plurality of second connection parts, one of the at least one second connection parts having a long hole for the x-axis direction alignment, and one of the at least one second connection parts having a long hole for the y-axis direction alignment are respectively disposed in both side directions of the diode.

9. The board structure of claim 1, further comprising a second fixing hole facing the first fixing hole and a second supporting member for supporting one surface of the transmission/reception board through the second fixing hole, wherein the transmission/reception board is inserted between the first fixing hole and the second fixing hole and supported by the first support member and the second support member.

10. The board structure of claim 9, wherein the first support member or the second support member is a second bolt.

11. The board structure of claim 9, wherein the first support member or the second support member is formed by curing an adhesive.

12. The board structure of claim 9, further comprising a damper between one surface of the transmission/reception board and the first support member or between the other surface of the transmission/reception board and the second support member.

13. The board structure of claim 12, wherein the damper is formed of a material having elasticity.

14. A lidar scanning device, comprising:

a light output means for emitting a pulse laser;

a light reflecting means for reflecting the pulse laser; and a light receiving means for receiving the pulse laser reflected through the light reflecting means, wherein at least one of the light output means and the light receiving means comprises the board structure according to claim 1.

15. A vehicle on which the lidar scanning device according to claim 14 is mounted.

16. A board structure for transmitting and receiving in a lidar device, which is installed to transmit or receive optical signals in the lidar device, the board structure comprising:

a lens barrel having a lens mounted on a first inner circumferential surface so as to be movable, and having a plurality of first connection parts provided on a first outer circumferential surface;

a guide barrel having a plurality of second connection parts each connected to a respective one of the plurality of first connection parts on a second outer circumferential surface, a transmission/reception board having a diode mounted on an upper surface and at least partially inserted into an inner space of the guide barrel and supported by the guide barrel, wherein each of the plurality of first connection parts and each of the plurality of second connection parts have a first through hole and a second through hole, respectively, wherein each of the plurality of first connection parts and the respective one of the plurality of second connection parts are connected to each other by a first bolt passing through the first through hole and the second through hole, and a first nut coupled with the first bolt, wherein any one of the first through hole and the second through hole is formed as a long hole in which the first bolt is movable in a direction perpendicular to the moving direction of the lens, wherein the diode is a surface-mount diode, and wherein at least one of the plurality of second connection parts has a long hole formed in a direction in which the x-axis direction alignment of the lens barrel and the guide barrel is possible, and at least another one of the plurality of second connection parts has a long hole formed in a direction in which the y-axis direction alignment of the lens barrel and the guide barrel is possible.

* * * * *